Patented June 9, 1953

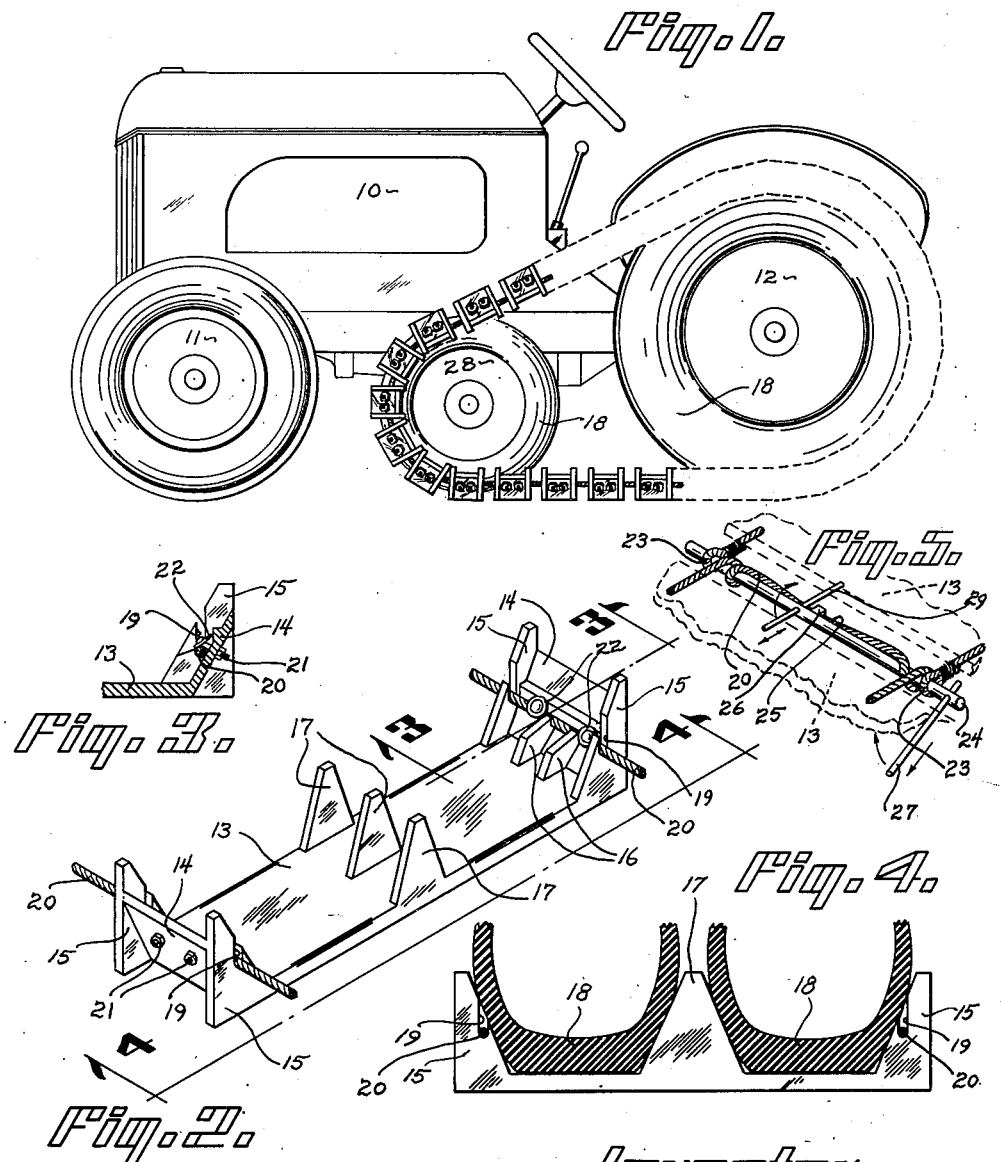

2,641,512

UNITED STATES PATENT OFFICE 2,641,512

ENDLESS TREAD FOR VEHICLES

Chester I. Leveke, Des Moines, Iowa

Application June 9, 1950, Serial No. 167,172

7 Claims. (Cl. 305—10)

My invention relates to the art of endless treads for wheeled prime movers. Specifically I have invented an endless tread traction and weight distributing means to make a wheeled prime mover into a semi endless tread type.

There are times of the year when traction for wheeled prime movers is poor, particularly on earthen surfaces. For example, if the ground is frosty or snow covered the surface of the ground becomes so slick that the relatively small surface of an ordinary wheeled prime mover that is in connection with the surface is so slight as to permit slippage between the wheels and the frosted or snow covered earth. Similarly, muddy ground following a heavy rain permits the wheels of the prime mover to move earth rather than to move the vehicle with respect to the earth. Under such circumstances an endless tread type of vehicle is much more valuable than a wheeled type because so much traction surface contacts the ground that progress can be made even under these unsatisfactory conditions. It is true that some types of soil, such as sand, etc., are so soft that a vehicle with wheels tends to sink down into the earth, thus causing the wheels to constantly be trying to move "up hill" as well as to move lineally. With an endless tread type of prime mover the weight of the vehicle is spread over a much broader area by reason of the amount of tread in connection with the surface. It is, therefore, possible for such a prime mover to operate on soft, muddy or sandy soils without sinking down. Under either of these two categories of surface condition, therefore, an endless tread prime mover has a great advantage over a wheeled type.

There are other times, however, when a vehicle on wheels is much more satisfactory. On most hard surfaces, for example, a wheeled type vehicle can operate perfectly satisfactory and is much less expensive than an endless tread construction. It is also true that on hard surface roadways and on hard ground a wheeled vehicle can be operated much more rapidly than can the endless tread type. Wheeled vehicles are also usually easier riding, furthermore, since no technique to date has been developed for making a pneumatically inflated endless tread. For some types of work, therefore, it is conceivable that a wheeled vehicle would be desired at times and an endless tread vehicle at other times.

As an example of the situation in which different forms of prime movers could be used to advantage by a single individual let us examine the demands of the cherry orchard operator. Some of the prime cherry orchard country in the United States is in northern Michigan where the soil is extremely sandy. In carrying on the various functions required of a prime mover in and around the trees, therefore, such as spraying, cultivating and transporting the harvested crop from the orchard itself to warehouses, etc., an endless tread prime mover is by far the most satisfactory type. When it is desired, however, to pull engineless vehicles, such as wagons or the like, over the highway to take products to market, or to haul supplies from the city or town to the orchard, a wheeled prime mover is far more advantageous. An orchard operator could provide himself with two different vehicles of course, but this is an expensive proposition and only the large operator can well afford such extravagance. A small orchard would benefit considerably by having a single prime mover which could be readily adapted to both forms of work. I have evolved a means for converting a wheeled prime mover into a semi endless tread for half-track type prime mover.

In view of the above, therefore, it is the principal object of my invention to provide an endless tread for wheeled vehicles. It is a further object of my invention to provide a tread that is detachably mounted and may be quickly and easily secured to or removed from a vehicle. A still further object of my invention is to provide a pad member for such endless treads that has a means thereon for securing it to a pair of flexible members so that a series of these pads so secured will form an endless tread. A still further object of my invention is to provide an endless tread attachment for wheeled prime movers that improves the traction considerably of such prime movers with respect to a surface and distribute the weight of such prime mover over a greater surface area. Yet a further object of my invention is to provide such an endless tread that is durable in use and inexpensive to manufacture.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a side view of a wheeled prime mover equipped with my endless tread. A portion of the tread is indicated by broken lines.

Fig. 2 is a perspective view of a single pad member with fragments of the flexible connectors included to illustrate the means of securing the pad to the flexible connectors.

Fig. 3 is a cross sectional view of a portion of one end of a single pad taken on line 3—3 of Fig. 2.

Fig. 4 is a side view of a single pad taken on line 4—4 of Fig. 2 but with fragments of wheels included to show how the pad members engage the wheels of the prime mover.

Fig. 5 is a detailed view of my tightening and securing means which permits the quick and easy mounting and dismounting of my endless tread on a wheeled prime mover.

Referring to the drawings I have used the numeral 10 to designate a prime mover having steerable front wheels 11 and powered rear wheels 12. These rear wheels are frequently provided with brakes which permit one rear wheel to be stopped independently of the other rear wheel. The importance of this will be apparent later. My invention consists of a pad member having a flat elongated base portion designated 13. One side of this base portion is designed to engage the ground and the other to engage the wheel of the prime mover. Illustratively I have shown my device to have the upwardly slanting ends 14, braced at each side by the triangular corner members 15. Between each corner brace 15 are buttress members 16 here shown as two in number. Although the device could be made for prime movers having either single or dual power wheels I have shown a dual wheel unit in Fig. 2 with the truncated triangular dividers 17 extending upwardly from the center portion of the wheel engaging side of the pad. Although my device could be constructed to operate on hard surface wheels, I have shown it, for purpose of illustration, as designed to operate with wheels having pneumatic tires 18 mounted thereon. Vertical slots designated 19 extend downwardly from the inner surface of each corner brace for the purpose of receiving a portion of a flexible connecting member, such as the cable 20 or the like. The pads and flexible member are secured together in any suitable manner and are here shown as the nut and bolt assemblies designated 21 with the washers 22 engaging the top portion of the cable together with the shank of the bolt to prevent the cable from moving upwardly from the vertical slot 19. With a series of pads secured to a flexible connector an endless track or tread is formed which may be secured to a prime mover having wheels, such as a farm tractor or the like, by securing the two ends of the track together. A very satisfactory and quick means for tightening and thus securing the track around the wheels of a tractor is shown in Fig. 5 in which small loops 23 have been formed in the two free ends of a single cable or connector. These loops are slipped over the ends of my connector rod 24 and from the rod a flexible connector extends down the series of pads and leaving a large loop 25 at the opposite end of the track. This large loop is hooked to the boss 26 on the tightening rod 24 and the T-handle 27 is inserted in the tightening rod and rotated to wrap a portion of the flexible member around tightening rod 24. With the track assembled around the power wheels of a tractor and the front wheels, or, if desired, over one of a pair of idler wheels designated 28 spaced between the front and back wheels as shown in Fig. 1, the tightening of the flexible member 20 by turning tightening rod 24 with the T-handle 27 will cause the track member to grip the wheels and be secured thereon. When the proper tension has been achieved by use of T-handle 27, a holding rod 29 is inserted as shown in Fig. 5 and has its ends bearing on adjacent pad members. This prevents rod 24 from rotating and thus holds the track in place on the vehicle.

The operation of installing or removing the track from a wheeled prime mover is very simple. A track of the proper length is laid out on the ground and the tractor, or the like, is driven onto it. The free ends of the track may then be lifted up and brought together and the loop 25 engaged on the boss 26 permitting the tightening and securing of the track. The tractor is now ready to operate as a half-track or semi-endless tread type prime mover. With the tractor thus equipped considerable more traction is provided and yet the steerable front wheels 11 are available for guiding the unit. It is also possible to aid the front wheels in steering the device by stopping one rear wheel with its individual brake means and allowing the differential to continue to rotate the endless tread on the opposite side. It is even conceivable that the endless tread could be put over the back and front wheels of the prime mover, the steerable wheels 11 secured in a straight forward position and the unit guided by simply applying the brakes to one or the other of the back wheels more or less after the fashion of the Caterpillar or Cletrac unit. To remove the track from the unit the T-handle 27 is reinserted on the rod 24, tension released from the holding rod 29 and by turning tightening rod 24 slightly. The holding rod 29 may then be manually removed and tension relieved on the track. It is then a simple matter to unhook loop 25 from the boss 26 disconnecting the ends of the track. The free ends may then be laid out flat on the ground and the tractor driven off.

It will also be noted that the structure of the individual pads is such that they may be readily removed and replaced if necessary. If a single pad were to become damaged or otherwise rendered inoperable the operator need only remove the nut and bolt assemblies 21 and lift the pad straight off of the flexible member 20. Because the slots engaging the flexible connector extend vertically a new pad may then be readily slipped on to the flexible connector and secured thereon by reinserting and tightening the nut and bolt assemblies 21.

Some changes may be made in the construction and arrangement of my endless tread for vehicles and method of making same without departing from the real spirit and purpose of my invention, and it is my intention to cover by my claims, any modified forms of structure or use of mechanical equivalents which may be reasonably included within their scope.

I claim:

1. In an endless tread for prime movers having wheels, a flexible member arranged in a U-shape, a plurality of pad members capable of having their respective ends secured to corresponding opposite portions of said flexible member, and a means for connecting the two free ends and loop of said flexible member together.

2. In an endless tread for prime movers having wheels, a flexible member arranged in a U-shape, a plurality of pad members capable of having their respective ends secured to corresponding opposite portions of said flexible member, and a means for adjustably connecting the two free ends and loop of said flexible member together.

3. In an endless tread for wheeled vehicles, a plurality of pads having end portions higher than their center portions; said pads having slots at each end and holes through the ends; said holes adjacent the line defined by the bottoms of said slots, a cable member formed in a U-shape and having a portion of its length in the slots of each of said pads, bolts extending through said holes and engaging said cable to secure said cable in said slots, nuts on said bolts, eyes formed in the free ends of said cable, a rod extending through said eyes, a boss fixed to said rod and capable of engaging the closed end of said U-shaped arranged cable, a means for rotating said rod to tighten said cable and pads around at least one wheel of a wheeled vehicle and a means for securing said rod in the tightened position.

4. In a pad of an endless tread traction means for the wheel of a prime mover, an elongated base portion with upwardly and outwardly extending ends, a triangular member extending away from the wheel engaging surface and from all four corners; said triangular members lying in planes parallel to the longitudinal axis of said base portion and each inner edge of said triangular members forming an obtuse angle with the plane of said wheel engaging side of said base portion, vertical slots in said triangular members for receiving flexible cables, holes in the upwardly and outwardly extending ends, and bolts in said holes for engagement with any flexible cables placed in said slots of said triangular members; said bolts being the sole elements positioned in the space defined by a projection of the planes of said upwardly and outwardly extending ends in a direction perpendicular to said last mentioned planes.

5. In a pad of an endless tread traction means for the wheel of a prime mover, an elongated base portion with upwardly and outwardly extending ends, a triangular member extending away from the wheel engaging surface and from all four corners; said triangular members lying in planes parallel to the longitudinal axis of said base portion and each inner edge of said triangular members forming an obtuse angle with the plane of said wheel engaging side of said base portion, vertical slots in said triangular members for receiving flexible cables, holes in the upwardly and outwardly extending ends, bolts in said holes for engagement with any flexible cables placed in said slots of said triangular members, and a plurality of triangular members extending in the same direction as said first mentioned triangular members and located at the center portion of said elongated base; said bolts being the sole elements positioned in the space defined by a projection of the planes of said upwardly and outwardly extending ends in a direction perpendicular to said last mentioned planes.

6. In a pad of an endless tread traction means for the wheel of a prime mover, an elongated base portion with upwardly and outwardly extending ends, a triangular member extending away from the wheel engaging surface and from all four corners; said triangular members lying in planes parallel to the longitudinal axis of said base portion and each inner edge of said triangular members forming an obtuse angle with the plane of said wheel engaging side of said base portion, vertical slots in said triangular members for receiving flexible cables, holes in the upwardly and outwardly extending ends, bolts in said holes for engagement with any flexible cables placed in said slots of said triangular members, and a triangular member extending in the same direction as said first mentioned triangular members and located at the center portion of said elongated base; said bolts being the sole elements positioned in the space defined by a projection of the planes of said upwardly and outwardly extending ends in a direction perpendicular to said last mentioned planes.

7. In a pad of an endless tread traction means for the wheels of an automotive vehicle, an elongated base portion flat on its bottom and with upwardly and outwardly sloping ends, members secured to at least one side of each end of said base portion and extending laterally beyond the sloping end portions of said base portion, and a means for securing said pad to an endless tread; said members and said upwardly and outwardly sloping end portions being substantially free from any element that would materially interfere with sliding movement of earthen materials over the outer face of said upwardly and outwardly sloping end portions.

CHESTER I. LEVEKE.

References Cited in the file of this patent

UNITED STATES PATENTS

| Number | Name | Date |
|---|---|---|
| 1,942,338 | Kennedy | Jan. 2, 1934 |
| 2,273,950 | Galanot et al. | Feb. 24, 1942 |
| 2,329,582 | Bishop | Sept. 14, 1943 |
| 2,455,307 | Irvin | Nov. 30, 1948 |